United States Patent
Allen et al.

(10) Patent No.: US 8,417,919 B2
(45) Date of Patent: Apr. 9, 2013

(54) ASSIGNING DIFFERENT SERIALIZATION IDENTIFIER TO OPERATIONS ON DIFFERENT DATA SET FOR EXECUTION IN RESPECTIVE PROCESSOR IN MULTI-PROCESSOR SYSTEM

(75) Inventors: Matthew Allen, Madison, WI (US); Gurindar S. Sohi, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 685 days.

(21) Appl. No.: 12/543,354

(22) Filed: Aug. 18, 2009

(65) Prior Publication Data

US 2010/0070740 A1 Mar. 18, 2010

Related U.S. Application Data

(60) Provisional application No. 61/096,574, filed on Sep. 12, 2008.

(51) Int. Cl.
*G06F 15/16* (2006.01)

(52) U.S. Cl.
USPC .......................................... 712/30; 712/216

(58) Field of Classification Search .................. None
See application file for complete search history.

(56) References Cited

U.S. PATENT DOCUMENTS 7,895,328 B2 * 2/2011 Eibach et al. ................. 709/226

OTHER PUBLICATIONS

Allen, Matthew D., et al., Serialization Sets: A Dynamic Dependence-Based Parallel Execution Model, Technical Report #1644, Aug. 2008, pp. 1-10, Computer Sciences Department, University of Wisconsin-Madison, Madison, Wisconsin, USA.
Allen, Matthew D., et al., Metadata-Based Parallelization of Program, Aug. 10, 2007, Computer Sciences Department, University of Wisconsin-Madison, Madison, Wisconsin, USA.
Rinard, Martin C., The Design, Implementation and Evaluation of Jade: A Portable, Implicitly Parallel Programming Language, A Disseration Submitted to the Department of Computer Science and the Committee on Graduate Studies of Stanford University in Partial Fulfillment of the Requirements for the Degree of Doctor of Philosophy, Sep. 1994, Palo, Alto, CA, USA.

* cited by examiner

*Primary Examiner* — Kenneth Kim
(74) *Attorney, Agent, or Firm* — Boyle Fredrickson S.C.

(57) ABSTRACT

A method of dynamic parallelization in a multi-processor identifies potentially independent computational operations, such as functions and methods, with a serializer that assigns a computational operation to a serialization set and a processor based on assessment of the data that the computational operation will be accessing upon execution.

28 Claims, 14 Drawing Sheets

US 8,417,919 B2

ASSIGNING DIFFERENT SERIALIZATION IDENTIFIER TO OPERATIONS ON DIFFERENT DATA SET FOR EXECUTION IN RESPECTIVE PROCESSOR IN MULTI-PROCESSOR SYSTEM

CROSS-REFERENCE TO RELATED APPLICATIONS

This application claims priority from previously filed U.S. Provisional Patent Application Ser. No. 61/096,574 filed on Sep. 12, 2008 hereby incorporated by reference in its entirety.

STATEMENT REGARDING FEDERALLY SPONSORED RESEARCH OR DEVELOPMENT

This invention was made with United States government support awarded by the following agencies:
NSF 0311572, 0702313 and 0551401
The United States government has certain rights in this invention.

BACKGROUND

The present invention relates to the implementation and execution of programs for multi-processor computers and in particular to a software system providing improved parallelization of programs.

Improvements in software performance have been realized primarily through the use of improved processor designs. Such performance improvements have the advantage of being completely transparent to the program generator (for example, a human programmer, compiler, or other program translator). However, achieving these benefits depends on the continuing availability of improved processors.

Parallelization offers another avenue for software performance improvement by dividing the execution of a software program into multiple components that can run simultaneously on a multi-processor computer. As more performance is required, more processors may be added to the system, ideally resulting in attendant performance improvement. However, generating parallel software is very difficult and costly. Accordingly, parallelization has traditionally been relegated to niche markets that can justify its extravagant costs.

Recently, technological forces have limited further performance improvements that can be efficiently realized for individual processors. For this reason, computer manufacturers have turned to designing processors composed of multiple cores, each core comprising circuitry (e. g., a CPU) necessary to independently perform arithmetic and logical operations. In many cases, the cores also support multiple execution contexts, allowing more than one program to run simultaneously on a single core (these cores are often referred to as multi-threaded cores and should not be confused with the software programming technique of multi-threading). A core is typically associated with a cache and an interconnection network allowing the sharing of common memory among the cores. These multi-core processors implement a multi-processor on a single chip. Due to the shift toward multi-core processors, parallelization is supplanting improved processor performance as the primary method for improving software performance.

Improved execution speed of a program using a multi-processor computer depends on the ability to divide a program into portions that may be executed in parallel on the different processors. Parallel execution in this context requires identifying portions of the program that are independent such that they do not simultaneously operate on the same data. While parallel applications are already common for certain domains, such as servers and scientific computation, the advent of multi-core processors increases the need for all types of software to implement parallel execution to realize increased performance.

Many current programs are written using a sequential programming model, expressed as a series of steps operating on data. This model provides a simple, intuitive programming interface because, at each step, the generator of the program (for example, the programmer, compiler, and/or some other form of translator) can assume the previous steps have been completed and the results are available for use. However, the implicit dependence between each step obscures possible independence among instructions needed for parallel execution. To statically parallelize a program written using the sequential programming model, a compiler must analyze all possible inputs to different portions of the program to establish their independence. Such automatic static parallelization works for programs which operate on regularly structured data, but has proven difficult for general programs.

One method of producing programs that may run in parallel is for a programmer to explicitly parallelize the program by dividing it into multiple threads which are designed and expected to execute independently. Creating such a multi-threaded program is a difficult procedure, since any access to shared data must be carefully synchronized to ensure mutual exclusion such that only one thread at a time may access the shared data. Failure to properly synchronize access to shared data can result in a condition called a data race, where the outcome of a computation depends on the interleaving of the operations of multiple processors on the same data. Identifying and reproducing data races are complicated by the fact that multithreaded program execution is non-deterministic; that is, for a given input, the program may produce different results, depending on the scheduling decisions made by the hardware and system software. Thus, programming with threads remains significantly more difficult and error prone than sequential programming.

BRIEF SUMMARY

The present applicants have recognized that many of the difficulties in correctly generating and executing parallel programs may be overcome using a mechanism that maintains sequential program semantics while implementing a dynamic parallel execution of independent computations in a manner that reduces the likelihood of data races. The present application describes a system and method for identifying potential independence among the computational operations constituting a program, coupled with a mechanism to opportunistically parallelize independent computations as they manifest during program execution. The mechanism ensures sequential program semantics via serialization, where all computational operations on a particular data item, such as a data structure or object, are performed in the same order they are encountered in the program. The likelihood of data race errors is reduced, since each individual data item is operated on by at most one processor at a time. Because the present application describes maintaining orderings between related computations and parallelizes independent computations, it produces deterministic parallel execution, significantly improving the predictability of parallel program execution over traditional multi-threading techniques.

In one embodiment, the program generator identifies potentially independent computational operations in the program, and replaces them with computation proxies, which identify a serialization set for the computational operation during the compilation, interpretation, or execution of the program. The computation proxy for a computational operation uses code provided by the program generator, called a serializer, to compute serialization sets where all operations on the same data item are assigned to the same serialization set, while operations on distinct data items are preferably spread across different serialization sets. The serialization set is represented by the serialization set identifier, which may be a number or any other representation identifying the serialization set. The computation proxy inserts the computational operation and its inputs into an ordered communication structure, e.g., a queue, such that all members of a given set are assigned to the same structure. Although the ordered communication structure may be any type of communication structure, we refer to the structure as a queue herein to describe an exemplary embodiment. A number of delegate threads, running on the processors in the system, remove computational operations from the queues and execute them on behalf of the program thread. Operations in a given serialization set are executed by no more than one delegate thread at a time, so that operations on a particular data item (which are assigned to the same serialization set) are operated on by at most one processor at a time. The serialization property is effected by the combination of: the assignment of operations on a particular data element to a single serialization set; inserting all operations in the same serialization set into the same ordered queue; and processing the operations in a given serialization set by a single delegate thread in the order they were inserted into the ordered queue. Parallel execution may be achieved by executing computational operations in different serialization sets simultaneously using multiple processors in a multi-processor system.

According to one exemplary embodiment, the present application provides a method of operation executing a program on a multi-processor computer with shared memory. The method identifies in the program a plurality of computational operations accessing sets of data in shared memory, where different computational operations can write to the same data elements during execution of the program. Next, a serialization set identifier is assigned to multiple given computational operations, said serialization set identifier for the each given computational operation based on the set of data accessed by the given computational operation when the given computational operation is executed. The computational operations are then assigned to different processors of the multi-processor computer for execution based on different serialization set identifiers of the computational operations.

It is thus one feature of at least one embodiment of the invention to provide a simple method of exploiting fine grain parallelization in common sequential programs in which different computational operations may write to the same data.

The method may further assign the computational operations to different ordered communication structures based on the different serialization set identifiers of the computational operations and read for execution, computational operations from the ordered communication structures by different processors of the multi-processor computer such that a single ordered communication structures is read by only a single processor at a given time.

It is thus one feature of at least one embodiment of the invention to provide a simple mechanism for assembling parallel threads, on-the-fly during execution of the program, using queues or the like.

The method may further identify within the program at least one synchronization point with respect to at least one given set of data and control the assignment of computational operations to the different processors such that all assigned and uncompleted computational operations writing the at least one given set of data are completed by the synchronization point.

It is thus one feature of at least one embodiment of the invention to permit resynchronization of the multiple processors by command as may be required for effective execution of standard programs when parallel operation is not indicated or when new allocation of parallel program structures may be warranted.

This synchronization may include the step of embedding within the program at the synchronization point a synchronization operation causing further assigning of computational operations to different processors to cease until a processor receiving a synchronization operation reports completion of the synchronization operation. A synchronization operation may be associated with a serialization set identifier and assigned to a processor of the multi-processor computer based on the serialization set identifier.

It is thus one feature of at least one embodiment of the invention to provide a simple method of resynchronizing a parallelized program using synchronization operations that may be assigned like computational operations.

The method may further monitor access of the shared memory by different processors executing the computational operations and detect conflicting access of a given set of data when the given set of data is accessed by processors associated with different serialization set identifiers.

It is thus one feature of at least one embodiment of the invention to permit the pre-emptive detection of errors in the parallelization process to improve the opportunities to seek parallelization of program code.

The monitoring may mark memory blocks accessed by a computational operation with the serialization set identifier for the computational operation and the detecting detects when a serialization set identifier associated with a pending write to the memory block differs from the marked serialization set identifier of the memory block.

It is thus one feature of at least one embodiment of the invention to provide a simple mechanism for detecting errors in parallelization by monitoring memory accesses such as may readily exploit existing hardware memory monitoring technologies.

The serialization set identifier may be a mapping of addresses of the set of data accessed by the computational operation to serialization set identifiers. Alternatively, the serialization set identifier may be a mapping of an instance number for a set of data accessed by the computational operation to serialization set identifiers. According to another alternative, the set of data accessed by computational operation may be computed from variables in the environment and the serialization set identifier may be a mapping of variables in the environment to serialization set identifiers.

It is thus one feature of at least one embodiment of the invention to accommodate multiple methods of allocating different computational operations to a serialization set using data easily available at run-time.

These particular features and advantages may apply to only some embodiments falling within the claims and thus do not define the scope of the invention. The following description and figures illustrate a preferred embodiment of the invention. Such an embodiment does not necessarily represent the full scope of the invention, however. Furthermore, some embodiments may include only parts of a preferred embodiment.

Therefore, reference must be made to the claims for interpreting the scope of the invention.

DETAILED DESCRIPTION

Figure 1:
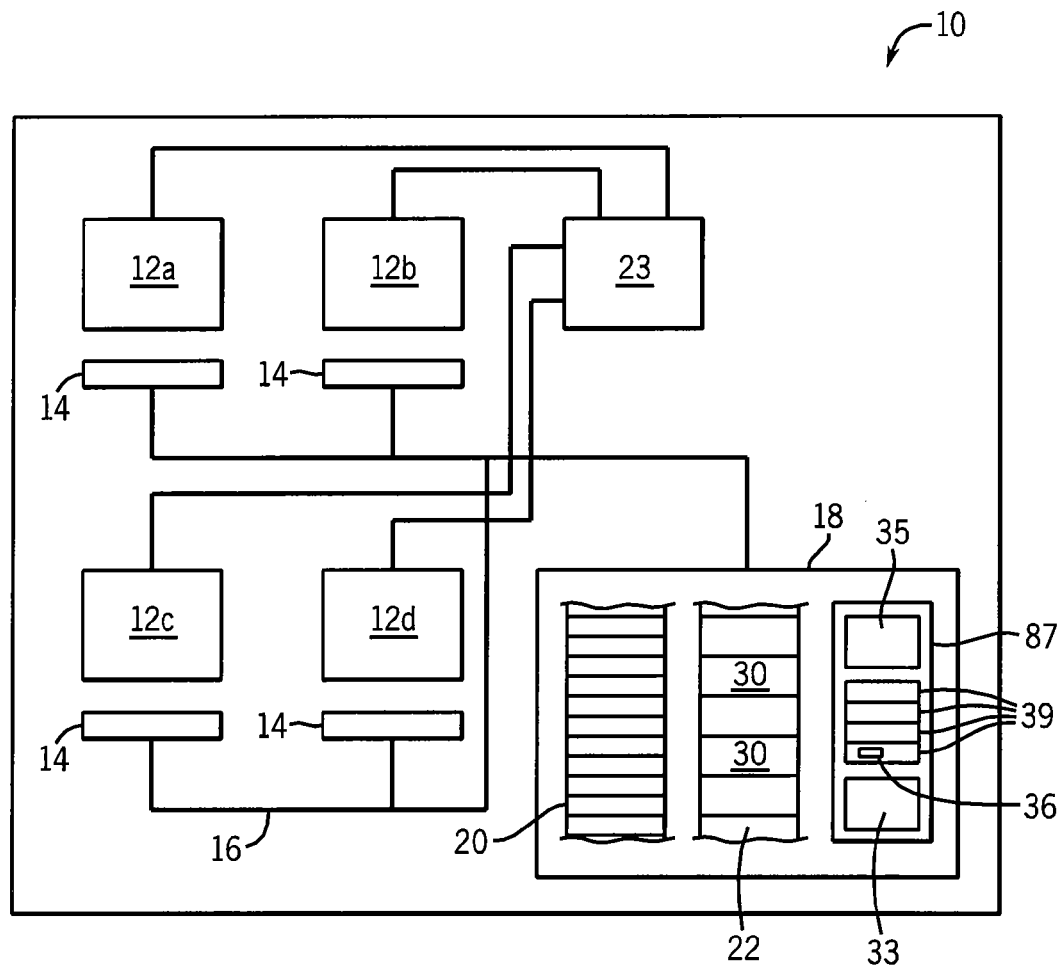
FIG. 1 is a simplified representation of a multi-processor system including four processors and suitable for implementation of the present application.

Referring now to FIG. 1, a multi-processor system 10 may include, for example, four processors 12a-12d each associated with a local memory 14 and communicating on a interconnection network structure 16 with shared memory 18. It will be understood that the present application applies to cases where the local memory 14 and shared memory 18 are managed automatically by hardware (i.e., local memory 14 is a cache), as well as cases where software must explicitly perform transfers among shared memory 18 and local memories 14. It will be further understood that shared memory 18 may in turn be a cache communicating with additional external memory (not shown). Each of the processors 12 may also communicate with common control circuitry 23 providing coordination of the processors 12 as is understood in the art. Although the preferred embodiment of the present application is described with respect to a multi-processor implemented as separate processors communicating with shared memory, it will be understood that the term multi-processor includes any type of computer system providing multiple execution contexts, including, but not limited to systems composed of multi-threaded processors, multi-core processors, heterogeneous computational units, or any combination thereof.

The shared memory 18 may hold a static program 20 prepared or modified according to an embodiment of the present invention as will be described and program data 22 accessed via the program 20 during execution. Shared memory 18 may further include runtime library 87 possibly providing class specifications (i.e., object prototypes) 35, pre-defined serializers 36, ordered communication structures (e.g., queues) 39, and code to implement the runtime operations of delegate threads 34, described in further detail hereinbelow.

Figure 2:
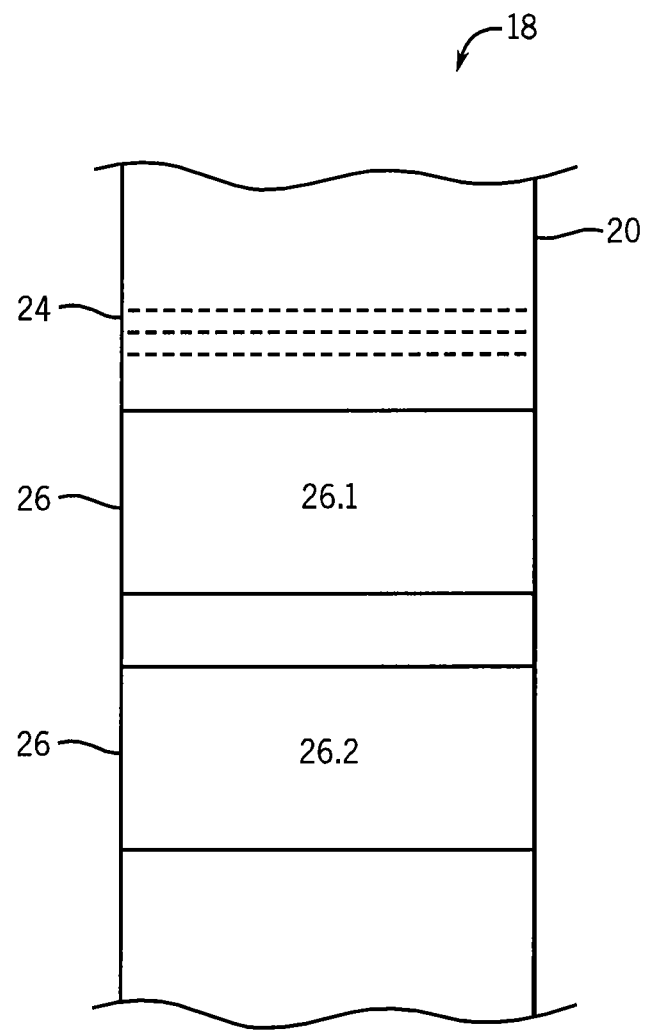
FIG. 2 is a simplified representation of a program composed of instructions grouped into computational operations.

Referring now to FIG. 2, the static program 20 may include a set of instructions 24 implementing computational operations 26 (depicted as first function 26.1 and second function 26.2), which may exhibit independence. Although static program 20 is shown and described herein with reference to a sequential program, it should be understood that the described system and method would also be useful for parallelization of sequential, multi-threaded, partly parallel, and/or other types and combinations of types of programs. In an exemplary embodiment, the computational operations 26 may be a function (also known as a procedure or method), typically accepting arguments and producing values. Collection of instructions 24 into computational operations 26 may be implemented by the programmer or may be implicit in the use of pre-programmed functions in runtime library 87. Other embodiments may use other computational operations, such as loop iterations, superblocks, hyperblocks, paths, or any other grouping of instructions into computational operations.

Figure 3:
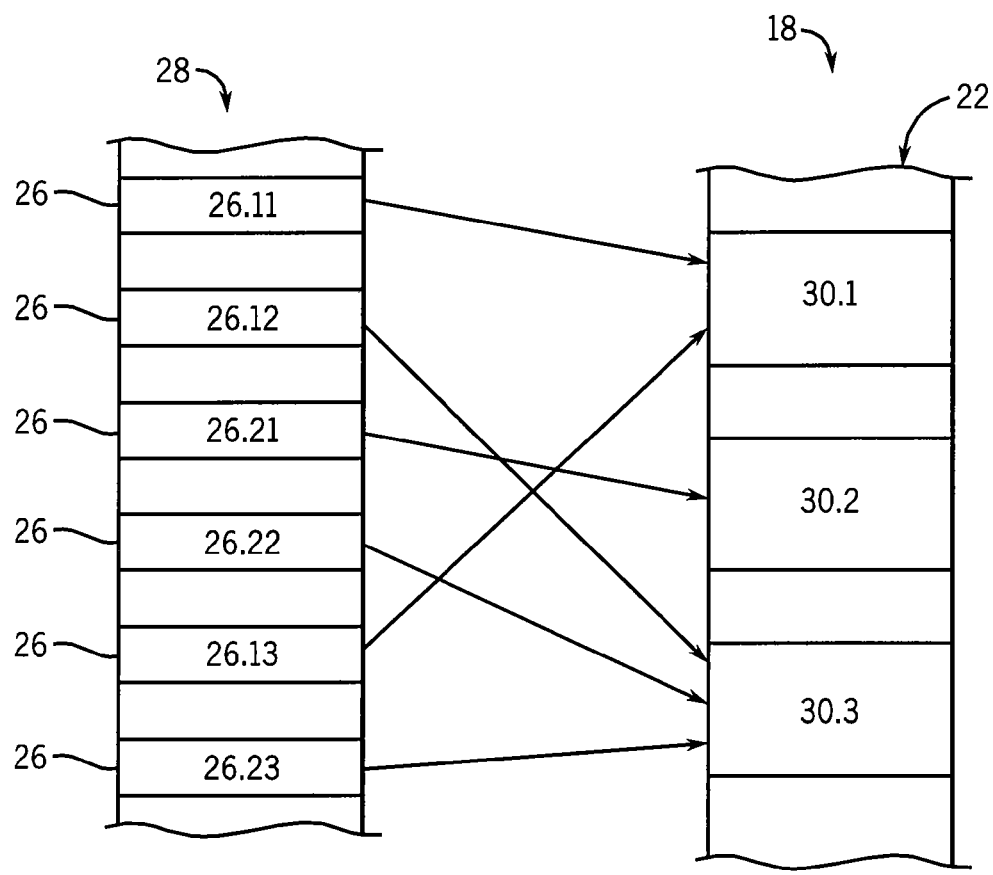
FIG. 3 is a linear representation of the dynamic execution of computational operations accessing various data elements, each dynamic execution executing a particular data set based on the changing inputs provided to the computational operation during its execution.

During execution of the original program 20 (run-time), as shown in FIG. 3, the computational operations 26.1 and 26.2 may be repeatedly executed, typically with different inputs, following a program execution thread 28 determined dynamically based on the execution of other parts of the program 20. Following the program execution thread 28, the computational operations 26.1 and 26.2 realize multiple dynamic executions (depicted as executions 26.11, 26.12, 26.21, 26.22, 26.13 and 26.23). During each execution, functions 26.1 and 26.2 may write to data sets 30 of data 22 of memory 18. Different executions of functions 26.1 and 26.2 with different arguments may cause the writing to different data sets (depicted as data sets 30.1, 30.2, 30.3).

The present application is particularly applicable where the data sets 30 are disjoint (non-overlapping). Disjoint data sets can be implemented in some programming languages by encapsulating the sets of data into different structures or objects. For languages that cannot provide such an embodiment, run-time bounds-checking code can be added to computational operations 26.1 and 26.2 to ensure that only a single data set is accessed, as is understood in the art. Note that the disjoint nature of data sets applies to data that may be written. Read-only data may be freely accessed in a shared manner by computational operations 26. For example, a programmer might create a data structure with two fields: fieldA and fieldB. If fieldA is written by the computational operations, then reads or writes to that field must only be performed by operations in the same serialization set. If fieldB is not written by any of the computational operations, then it would be acceptable for operations in any serialization set to read fieldB, because data races errors cannot occur without a write.

Referring now to FIGS. 4, 5, 6, 7 and 8, one exemplary embodiment of program 20 employing a number of functional blocks that may be flexibly executed using combinations of hardware and software is shown and described. For clarity, one possible allocation of these functional elements will be described; however this description should not be considered limiting with respect to alternative embodiments.

Figure 4:
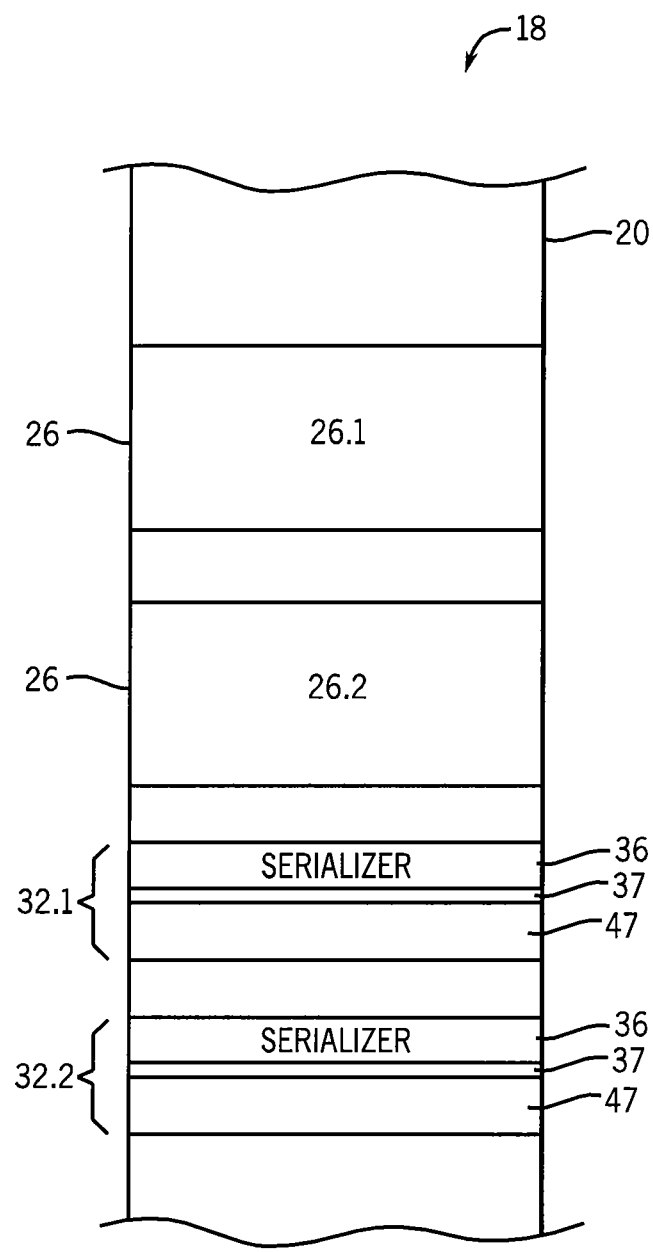
FIG. 4 is a simplified representation of a program modified with computation proxies of the present application.

Referring now to FIG. 4, a program 20, stored in memory 18, is modified according to an exemplary embodiment of the present invention by replacing at least some of the computational operations 26 with a computation proxy 32 (shown as computation proxies 32.1 and 32.2, each computation proxy including a serializer 36) that cause the computational operations 26 to be executed on additional processors 12 in the system is shown.

Figure 5:
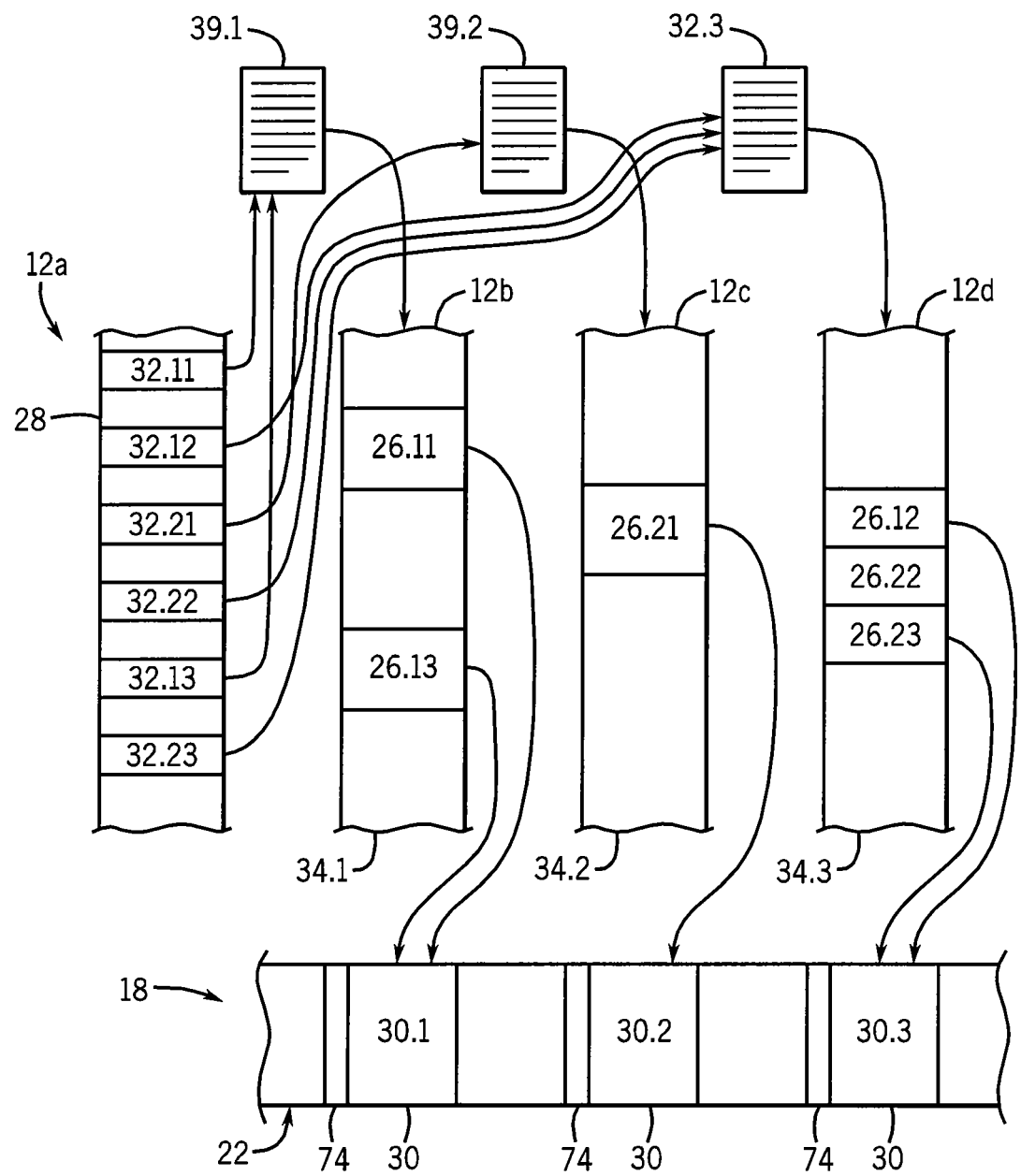
FIG. 5 is a linear representation of the dynamic execution of the modified program of the present application, executing computation proxies in the program thread which assign execution of a computational operation to a delegate thread running on another processor such that the data sets accessed by the computational operations are each accessed by at most a single delegate thread.

Referring now to FIG. 5, the program execution thread 28 is shown sequentially executing the computational proxies 32 which assign computational operations 26 to ordered communication structures 39.1, 39.2, 39.3, in this example, each associated with one of the delegate threads 34.1, 34.2, 34.3, running on additional processors 12b-12d in the system. In this embodiment, the computational operations are assigned to the various delegate threads 34 so that each data set 30 is written to, or written to and read, by no more than one delegate thread 34 running on an additional processor 12. Advantageously, the overall execution time of program 20 may be reduced by overlapping execution of the computational operations 26.

Figure 6:
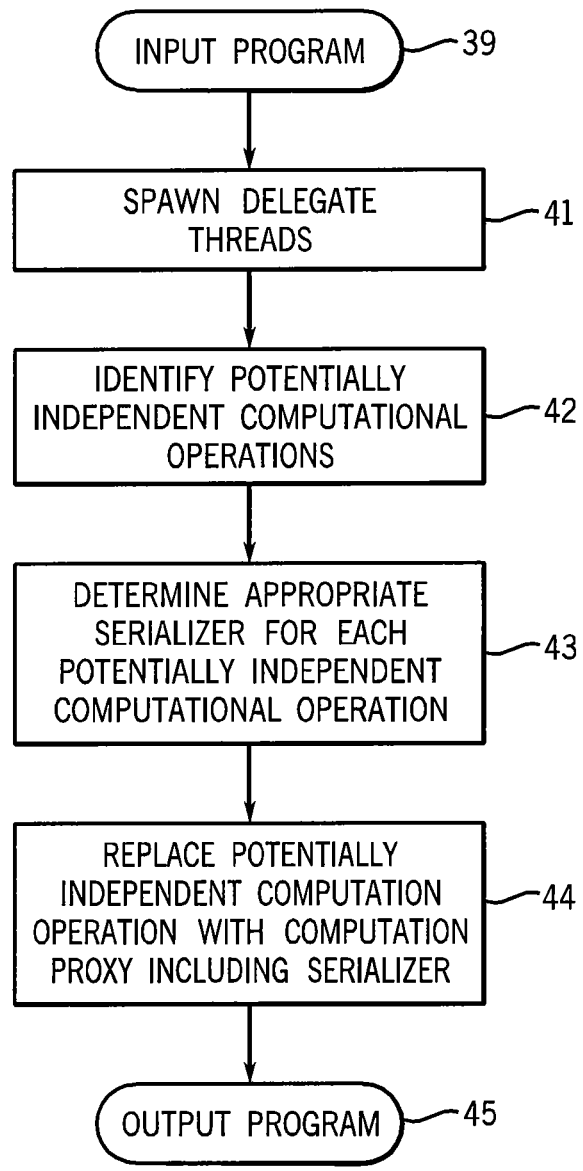
FIG. 6 is a flow chart of an embodiment of the present application showing the principal steps for modifying the program to use the present application.

Referring now to FIG. 6, the operation of the present invention may be implemented by modifying the program 20, using the program generator. First, as indicated by process block 41, the program 20 may be modified to spawn a number of delegate threads 34 on additional processors 12 in a multi-processor system. Spawning delegate threads includes creating the new threads and providing code implementing the actions of the delegate threads as described in further detail below.

A second step 42 may be implemented to identify potentially independent computational operations 26. Identification of potentially independent computations is done by the program generator, based on an understanding of the purpose and context of the computational operations 26. This understanding may be based on programmer knowledge, programmer annotations, static analysis, dynamic profiling, or other techniques to discover program behavior.

A step 43 may be implemented to specify a serializer 36 for the computational operation 26. According to one exemplary embodiment, serializer 36 groups computational operations 26 that access a common data set 30 together and attempts to separate computational operations 26 that access distinct data sets 30 by assigning the first group with a common serialization set identifier and assigning the latter group with different serialization set identifiers. According to the exemplary embodiment, a group of computational operations that access the same data is called a serialization set 38 (shown generally in FIG. 8). For simplicity, the serialization set 38 and the serialization set identifier identifying the serialization set 38 will be designated henceforth by the same number. There may be many possible serializers that group computational operations 26 that access a common data set 30, so the program generator may need to consider several criteria to select a serializer 36 that provides performance improvement when the software is executed. These criteria may include: the computational burden incurred by the serializer 36, since the computation proxy 32 must execute faster than the computational operation 26 it replaces to improve program performance; and the number of different serialization sets 38 identified by the serializer 36, since a greater number of serialization sets 38 may indicate more opportunities for parallel execution. The serializer 36 may be selected by the program generator based on its knowledge of the purpose and context of the computational operations 26; it may be selected adaptively by executing the program using a variety of different serializers 36 and choosing the one providing the greatest performance advantage; or some other technique for choosing a serializer given the selection criteria.

Generally, the serializer 36 dynamically associates a serialization set identifier with a computational operation 26 to reflect dependences as determined by the input data to the program.

According to one exemplary embodiment, the serializer 36 may be composed of a plurality of instructions, inserted into the computation proxy 32, or enclosed in a function that is called by the computation proxy. These instructions may be the machine instructions suitable for direct execution by a processor 12, or statements in a higher-level computer language which may be translated by a compiler or interpreter into machine instructions.

Determining whether two computational operations 26 access the same or different data sets 30 is generally determined after the code making up the computational operations is generated, since the determination depends on the inputs to the program and the resulting dynamic execution. Thus, the serializer 36 typically computes the serialization set identifier sometime after program generation, such as during the compilation, interpretation, or execution of the program. Importantly, however, the serialization set identifier is computed only after the location of the data that will be written by the computational operation during execution has been resolved based on at least partial execution of the program, and is not computed statically before any execution of the program.

The implementation of serializer 36 may depend on the requirements of the particular software, as described in the example below, but there are several embodiments that are generally useful for the case where the data sets 30 are stored in non-overlapping or disjoint memory regions, such as software data structures or objects 80. The first embodiment of a serializer 36 may compute the starting address of the data element and use this as the serialization set identifier 38. Because the data sets 30 are disjoint, the starting address provides a unique serialization set identifier 38 for the data set, so that no two data sets are mapped to the same identifier.

Figure 11A:
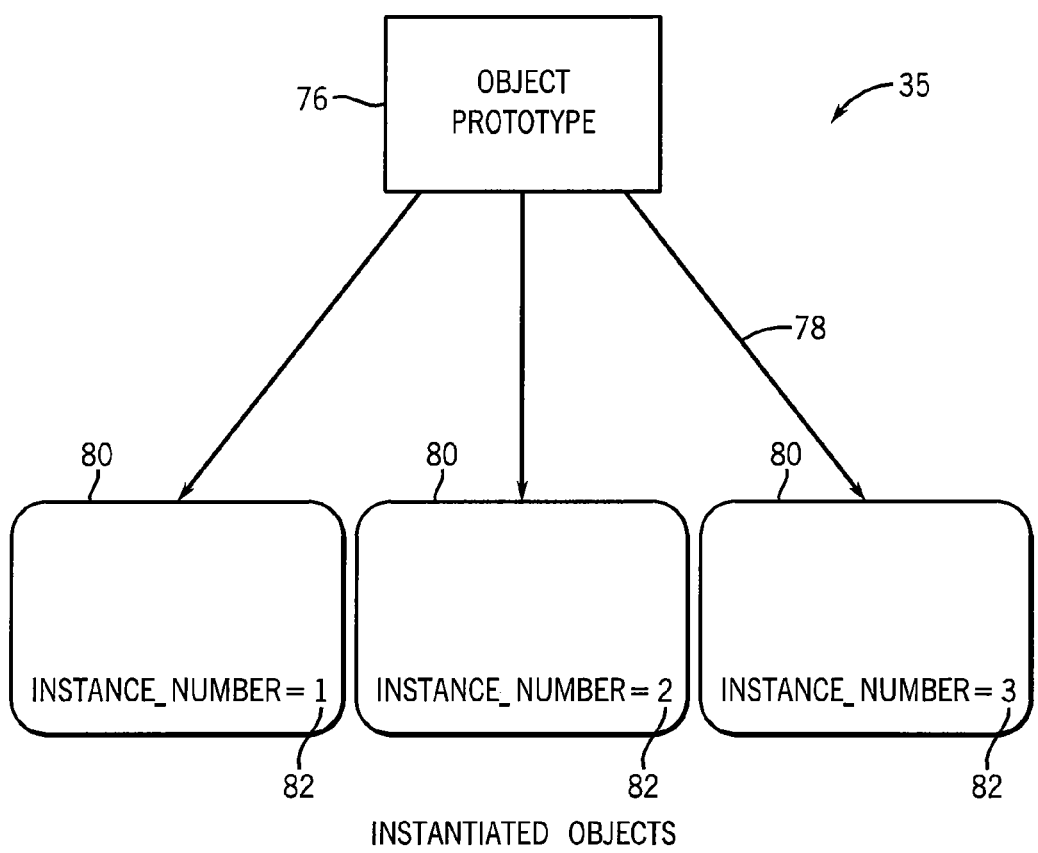
FIG. 11a is a flow diagram depicting software objects using instantiation numbers for the generation of serialization set identifiers.

The second embodiment of a serializer 36 for data structures or objects 80 stored in non-overlapping memory regions is the use of an instance number 82. Referring now to FIG. 11a, a typical embodiment of a software object 80 employs a class specification 76 (e.g., an object or structure prototype) that may be instantiated 78 into multiple instances 80 during execution of the program execution thread 28. Each instance 80 may be assigned an instance number 82 that increases as each new object 80 is instantiated and as is understood in the art. The instance number 82 may be used to derive the serialization set identifier 38 by the serializer 36, for example, by a one-to-one mapping between unique serialization set identifiers 38 and instance numbers. Thus, for example, each instance of a given object may be given a different unique serialization set identifier 38 based on an expectation that the data written by the different instances of the object will be to different, disjoint locations in memory.

Figure 11B:
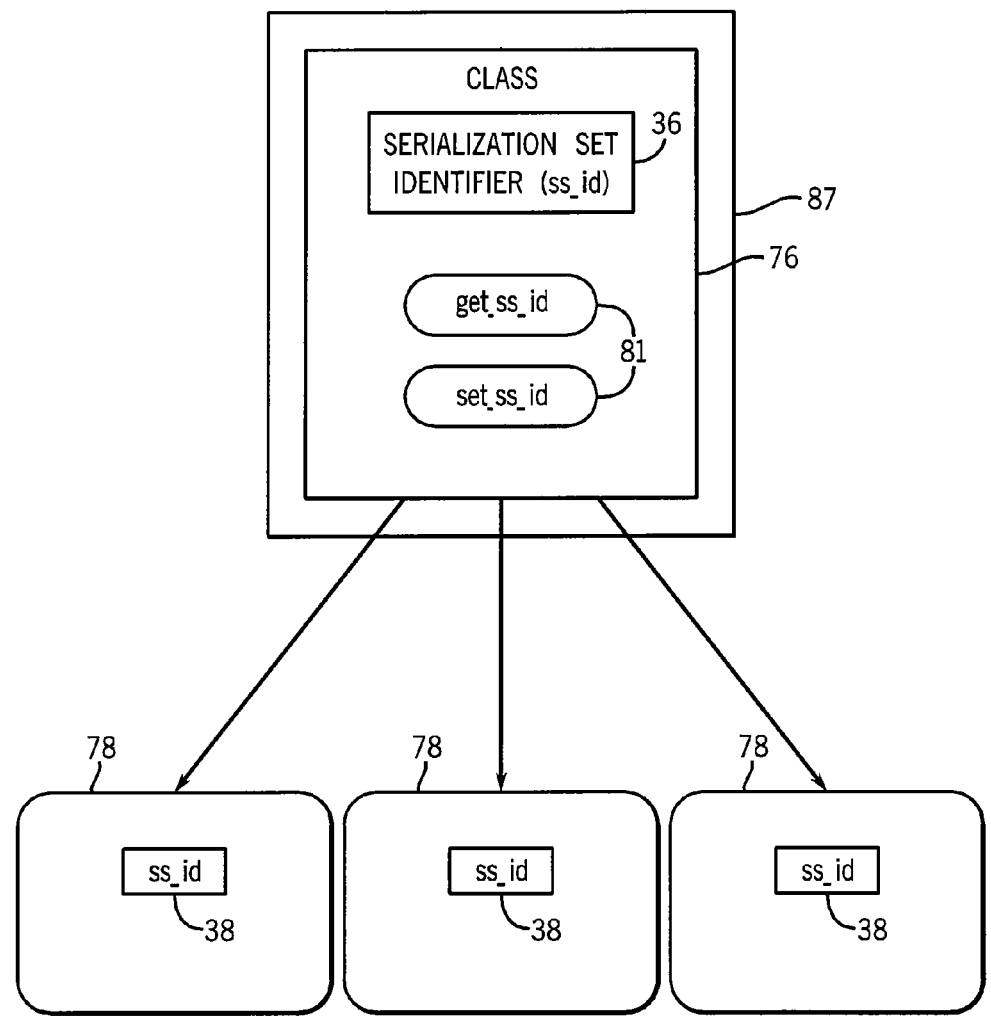
FIG. 11b is a diagram of a library providing support code for the program execution as library elements, possibly including pre-defined serializers, class specifications (i.e., object prototypes), and code to implement delegate threads.

Referring now to FIG. 11b, in a third embodiment, a runtime library 87 provides an interface to get or set the serialization set identifier 38 of each data structure or object 80 forming all or part of a computational operation 26. The serializer 36, which may also be provided by the library 87, in this case just returns the value of the serialization set identifier 38 (in this case instance number 82) associated with the data structure or object 80, for example, using an interface (such as an object methods 81) associated with the data structure or class specification 76. This allows the program generator to use pre-written serializer 36 associated with a library 87 to directly specify serialization set identifiers that reflect the dependences between computational operations 26, as determined by the data accessed by the computational operations as well as the input data to the program. This embodiment may be advantageous, because it does not require the serialization set identifier to be recomputed at the execution of every computational operation (merely accessed). Note that while this embodiment allows the serialization set identifier for a given data structure or object to be changed at any point during the dynamic execution of the program, to avoid data race errors it may be necessary to ensure that all computational operations 26 associated with the previous serialization set identifier 38 have completed via synchronization as will be described hereinbelow.

While, in general, the goal of the serializer 36 is to map computational operations 26 that access distinct data sets 30 to different serialization sets 38, there may be cases where it is desirable to map certain computational operations 26 on distinct data sets 30 to the same serialization sets 38 to ensure affinity between the operations. Modern processors often achieve better performance when operating on data with spatial locality, i.e., data that is located in close proximity, rather than spread throughout memory. Furthermore, cache-coherent multiprocessors divide memory into blocks or lines comprising multiple memory locations, and enforce the invariant that only one processor may modify a block at a time. When multiple processors 12 operate on distinct data sets 30 co-located in a cache line, performance may be degraded through the false-sharing effect, because multiple processors cannot simultaneously modify distinct data elements stored in a single cache line. By assigning multiple computational operations 26 on distinct data sets 30 to the same serialization set, the program generator may improve performance via spatial locality effects and avoid performance loss due to false-sharing effects. Thus, the use of distinct serialization sets to indicate independence between computational operations 26 can be extended from the strict independence of distinct data sets 30 to broader sources of independence including, but not limited to, performance-related independence.

The serializer 36 may directly compute the identity of the serialization set 38, or it may rely on a serialization function associated with the computational operation 26 or the data sets 30. Typically, when the computational operation 26 is a function not specifically associated with a data set 30, the serialization function will be a function whose arguments may include some or all of the arguments passed to the computational operation 26. In this instance, the serialization set identifier may be computed as previously described. Besides arguments passed to the computational operation 26, the serializer 36 may also use the values of any variables present in the environment (the set of all variables used by the program 20 and their assigned values at that point in the program 20) to compute the serialization set identifier. When the computational operation 26 is implicitly related to a data set 30, e.g. where the data element is an object in the sense of object-oriented programming, and the computational operation 26 is a method or function associated with that particular object, the object may have associated with it a specific serialization method that ensures that invocations of different methods associated with that object are all mapped to the same serialization set 38. The specific form of the serializer 36 is determined by the program generator when a particular computational operation 26 is replaced with a computation proxy 32 in a third step 44.

Step 44 replaces the computational operation 26 with a computation proxy 32, which performs the necessary actions to send the computational operation 26 to a delegate thread 34 for execution. The components of the computation proxy 32 are described in the context of its execution below. The resultant output program is provided in a step 45.

Figure 7:
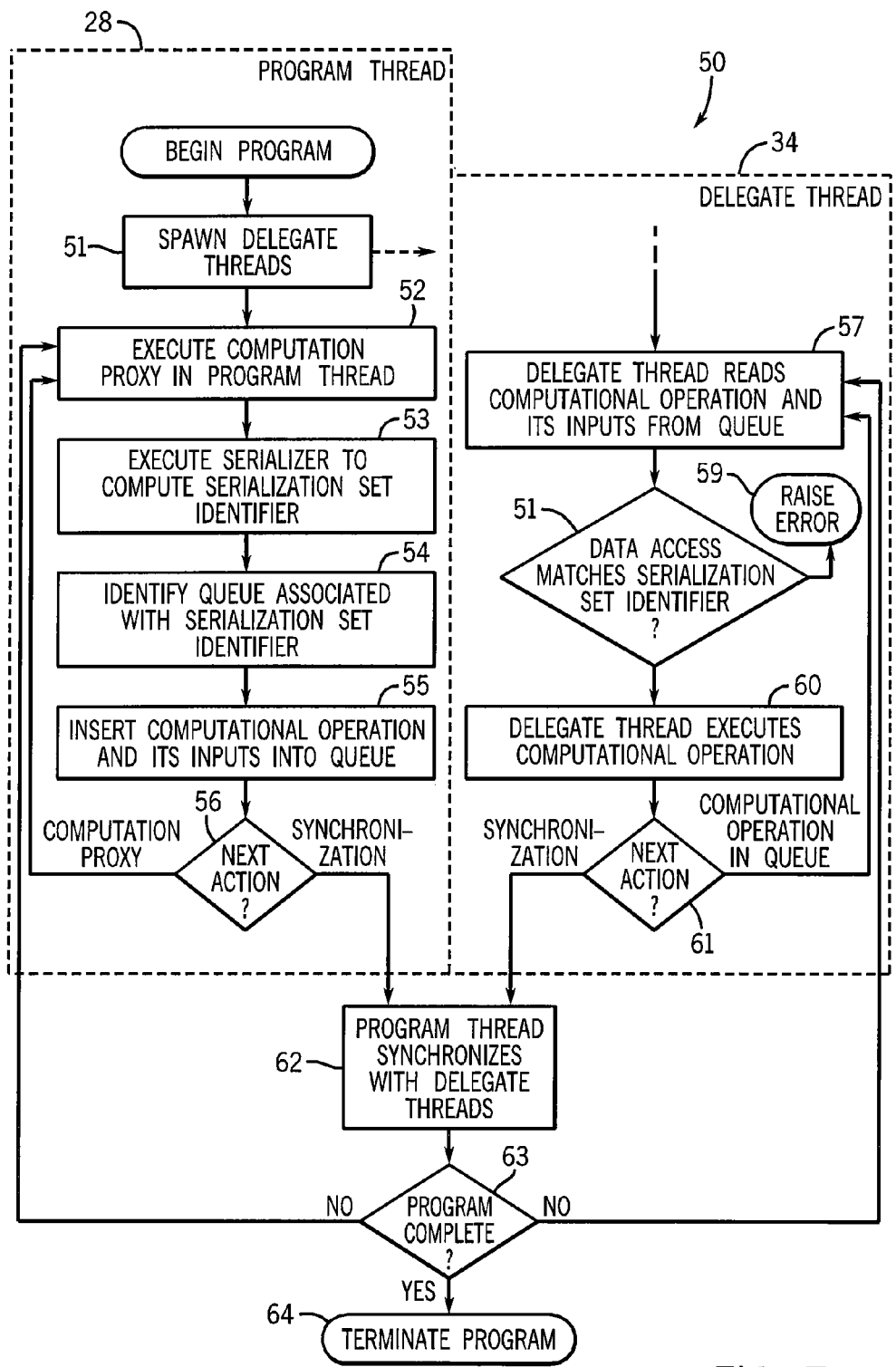
FIG. 7 is a flow chart of an embodiment of the present application showing the principal steps for executing the program.
Figure 8:
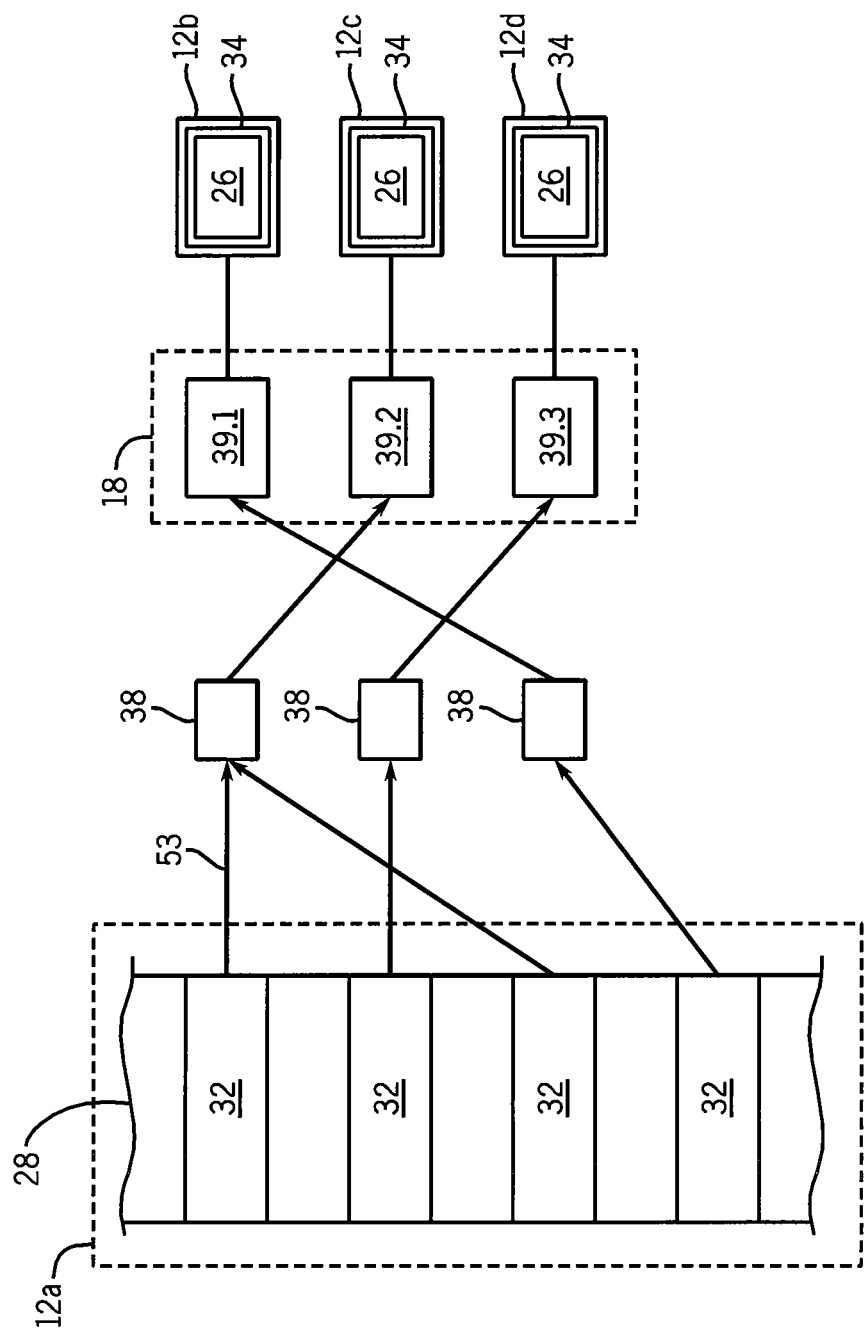
FIG. 8 is a process flow diagram of the present application showing the principal steps of the program thread executing computation proxies identifying the serialization set identifier, the program thread inserting computational operations into ordered communication structures, and delegate threads removing computational operations from the queues and executing them on behalf of the program thread.

Referring now to FIG. 7, in an exemplary embodiment, a flow chart 50 depicts steps in the execution of the modified program 20 comprising the actions of the program thread 28 and the delegate threads 34 (represented by one example). In one exemplary embodiment, the actions performed to orchestrate the parallel execution of the program 20 are implemented by a plurality of functions in a runtime library made available to the program generator. By providing this functionality in a runtime library, the program generator may specify the program 20, identifying potentially independent computational operations 26 and specifying serializers 36, and the actions needed to achieve parallel execution are then carried out by the runtime library during program compilation, execution, or interpretation, without further intervention from the program generator.

At a first step 51, the program thread 28 spawns the desired number of delegate threads 34. Program thread 28 also establishes the ordered communication structures 39, shown in FIGS. 5 and 8, needed to communicate the computational operations and their inputs to the delegate threads. Once the delegate threads 34 and ordered communication structures 39 are established, the program thread 28 then executes the code for the program thread until it reaches a computation proxy 32.

Referring again to FIG. 4, the computation proxy 32 may be composed of three components executed in the program thread 28 in a step 52. A first component is the serializer 36, which, as previously described, generates a serialization set identifier based on an assessment of the data accessed by the computational operation 26 in a step 53.

A second component of the computation proxy 32 is code 37 to determine an address or number providing identification of an ordered communication structure 39, shown as a queue for the purposes of explanation, associated with the serialization set 38 in a step 54. Although ordered communication structure 39 may be any type of communication structure, we will describe structure 39 with reference to a queue to describe an exemplary embodiment. The structure 39 is configured to implement the communication between program thread 28 and delegate threads running on additional processors 12 that will execute the computational operations 26 on behalf of the program thread 28. The computational operations 26 comprising the membership of a serialization set may be assigned to the same queue to maintain sequential execution semantics, i.e., program ordering of the computational operations 26 on the data sets 30.

The exact number of queues may vary, but will generally be greater than or equal to one, and less than or equal to the number of serialization sets 38. One embodiment employs a number of queues equal to the number of delegate threads running in the multi-processor system 10, which may be equal to one less than the number of processors 12. More generally, the exact number of ordered communication structures 39 may vary, depending on the implementation of the runtime library. In a simple embodiment, there may be one ordered communication structure 39 between the program thread 28 and delegate threads 34. In another embodiment, there may be an ordered communication structure 39 for each serialization set, where one end of the ordered communication structure 39 is accessed by the program thread 28, and the other end is accessed by a delegate thread 34. In this embodiment, access to the ordered communication structure by a delegate thread 34 may be scheduled according to existing task scheduling techniques, so long as access to the ordered communication structure 39 is granted to only a single delegate thread at any given time.

A third component of the computation proxy 32 is code 47 to effect the insertion into the ordered communication structure 39 of the necessary information for execution of the computational operation 26 in a step 55. This information typically includes the identity of the computational operation 26 and its inputs. The identity of the computational operation may be in the form of a handle, the address of the computational operation, a function pointer, a method pointer, or other means for identification. If the computational operation 26 is a function, the inputs may be the arguments to the function. These inputs may identify the data set 30 to be operated on or that may be computed during the execution of the computational operation 26. If the computational operation 26 is a method in an object-oriented style program, the inputs may also include the address of the object with which the method is associated. Following execution of the computation proxy, a determination is made in a step 56 whether the next operation is another computation proxy, in which case, steps 52-55 are repeated, or a synchronization operation, processed as described below.

At the conclusion of the computation proxy 32, the structure 39 contains sufficient information for another processor 12 to execute the computational operation 26 in a step 57. Each structure 39 may be associated with at most one delegate thread running on processors 12*b*-12*d* at any given time. Another delegate thread may be run on processor 12*a* if the program thread 28 does not utilize all of its resources. In one embodiment, the delegate threads remove and execute the computational operations 26 from the queue 39 using the inputs also supplied in an ordered queue, in a manner to ensure the ordering of computational operations 26 in the same serialization set 38 is maintained as determined by the program thread 28. In some embodiments, the delegate threads may change the ordering of execution of the items in the queue so long as operations on any particular serialization set 38 are performed in serial order as determined by the program thread. Note that each structure 39 is accessed by at most one processor 12 at a time, and that the members of a particular serialization set 38 are mapped to no more than one structure 39. Further, since all computational operations on a particular data set 30 are mapped to the same serialization set, no data set 30 may be operated on by more than one processor 12. Accordingly, the probability of data race errors is reduced.

Figure 9:
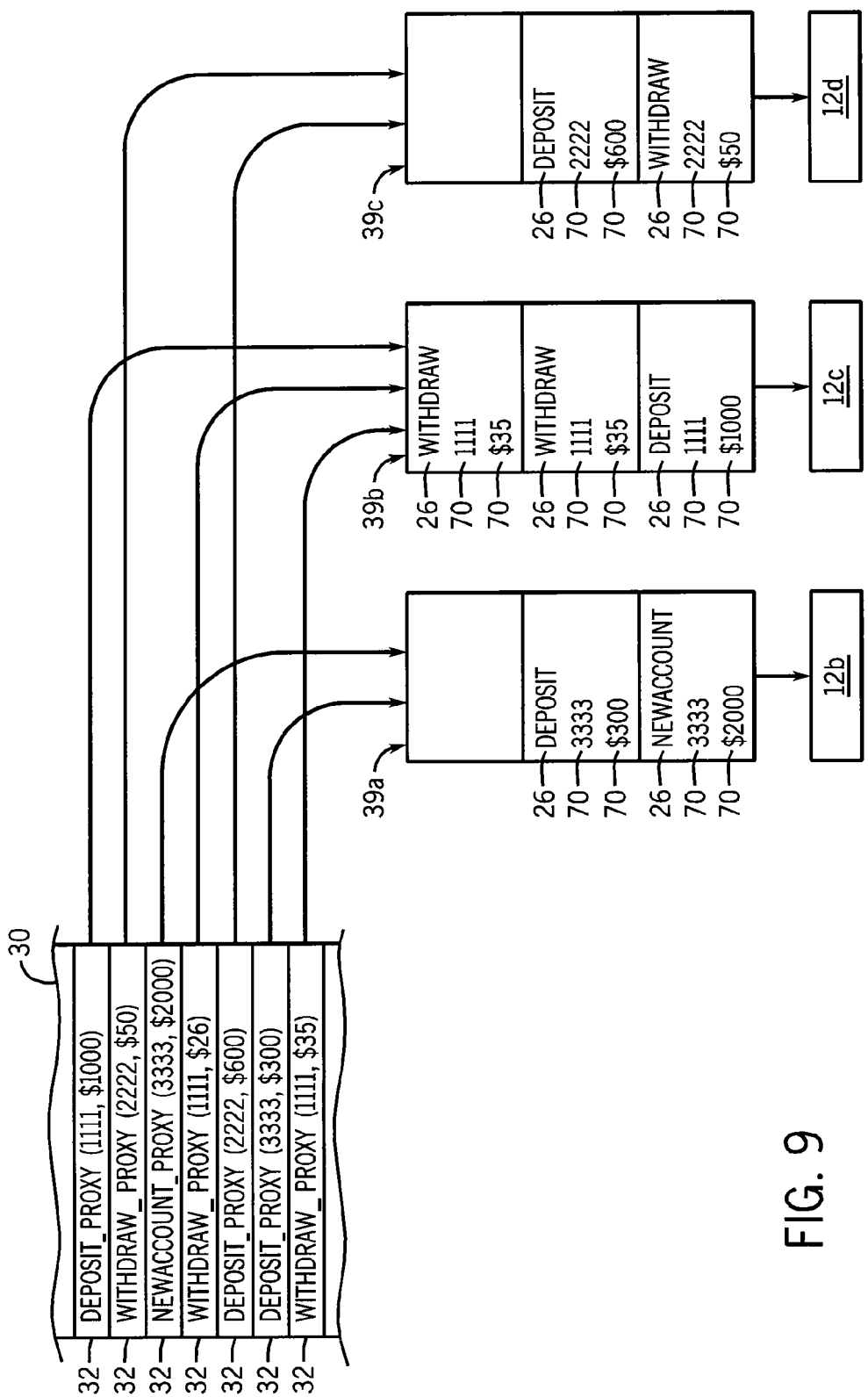
FIG. 9 is an example application program parallelized per an embodiment of the present application into queues associated with different processors.
Figure 10:
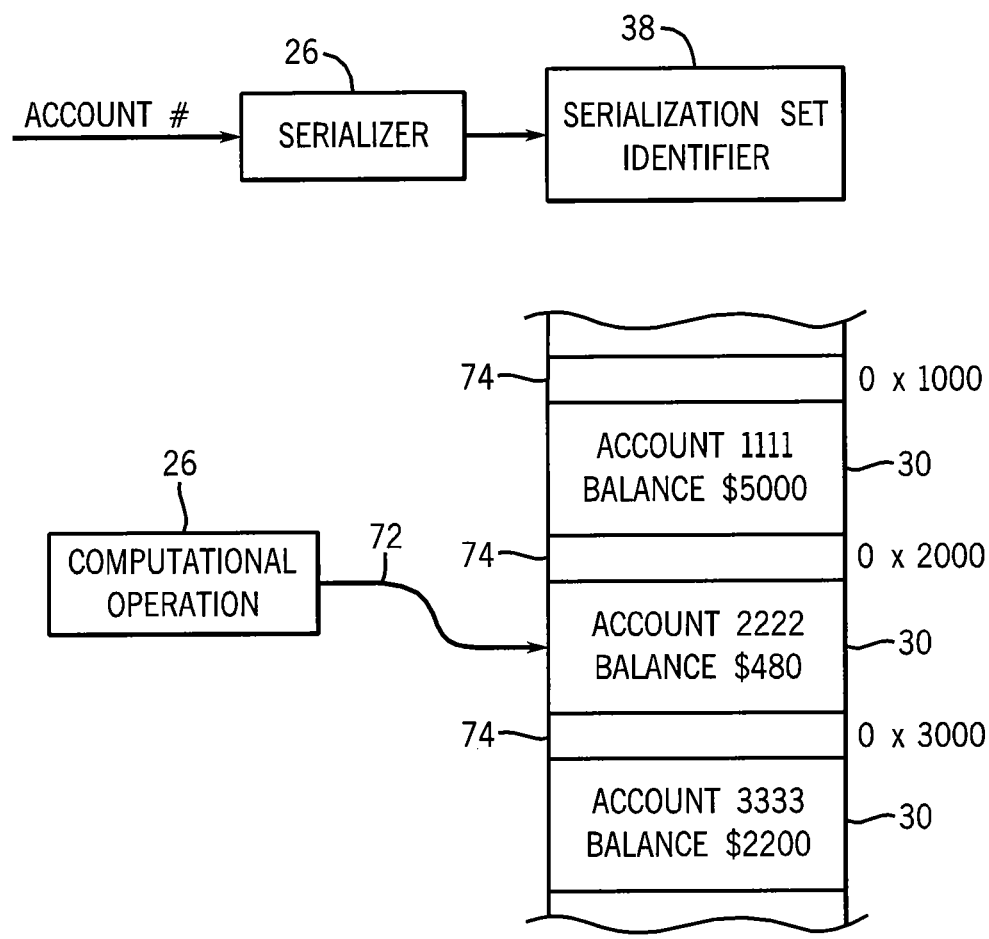
FIG. 10 is a flow diagram illustrating an exemplary computation of a serialization set identifier for an example application program.

Referring now to FIGS. 9 and 10, an exemplary program 20 is shown including a series of banking transactions forming computational operations 26 for depositing money, withdrawing money, creating a new account, or checking an account balance. Each of these computational operations 26 may be simple functions accepting arguments 70, in this case an account number (e.g. 1111, 2222, 3333) and a dollar amount (e.g., $1000, $50, $2000). Based on the argument and the particular function of the computational operation 26, the computational operation 26 may access 72 different data sets 30 to change account balances. This example describes functions that may be implemented in an online banking system responding to instructions by multiple remote users. The example should be understood to be an illustrative example of an embodiment of the present invention, rather than a practical embodiment of a banking system.

Referring now to FIG. 10, an operation for replacing a computational operation 26 with a computation proxy 32 containing a serializer 36 which generates a serialization set identifier 38 for the computational operation 26 is shown, according to an exemplary embodiment. In the simplest example, the program generator writes instructions of the serializer 36 with knowledge of the purpose and operation of the computational operation 26. Because computation proxy 32 containing the serializer may be inserted at the original location of the computational operation 26, in a preferred embodiment, it may use as inputs the same information that would be available to computational operation 26. In particular, when the computational operation 26 is a function, the arguments to the function can be used to compose an appropriate serializer. In some cases, it may be useful to also utilize data that is not used by the computational operation 26, but is readily available in the environment of this operation. Using as inputs some combination of the inputs to computational operation 26 and other data available at that point in the program execution, the specified serializer 36 is used to deduce the proper serialization set for the computational operation 26.

In general, any of a variety of techniques may be used for creating the serializer 36 so long as the technique generates a single serialization set identifier 38 for a particular data set 30. As shown in FIG. 10, one embodiment for generating a serialization set identifier 38 uses the argument of account number to identify a particular memory address holding the account in the same manner as done by the computational operation 26. Accordingly, for example, the serializer 36 may make a call to a function for identifying a pointer to the account data structure. In this example, the pointer may reveal a data set 30 beginning at address 0x2000 related to the particular account argument 70. This address 0x2000 may then be used as the serialization set identifier 38. Using this identifier ensures that all operations on a particular bank account data set 30 will be mapped to the same serialization set.

In general, using the starting address of disjoint data sets 30 will generate a correct serialization set identifier, and thus represents a good strategy for computing serialization set identifiers when this starting address is readily available. In the current example, a disadvantage with determining a serialization set identifier 38 based on the accessed data sets 30 is that it requires the computational burden of calling a function to identify the address of the data structure. In this case, the burden may be comparable to that of the instructions of the computational operation 26 itself. Accordingly, an alternative for the address of the data set 30 may be found in the argument 70 of the account number itself. Here the program generator uses knowledge that there is a one-to-one correspondence between the account numbers and the account data structures, i.e. there is only one account number for each data structure. In this case, a serialization set identifier of 2222 is used.

An arbitrary range of serialization set identifiers 38 may be used so that there is no limit to the amount of independence that is exposed. After the serializer 36 executes and computes the serialization set identifier 38, the computation proxy 32 uses this identifier to map the computational operation 26 to a queue 39. Multiple serialization identifiers may map to a single queue 39, but a single serialization identifier should not map to more than one queue 39. If the serialization set identifier is a number, one embodiment may use a very simple queue mapping that takes the modulus of the serialization set identifier 38 and the number of queues 39. Various functions, such as hash functions, may also be applied to the serialization identifier to increase the likelihood of evenly distributing computational operations among the available queues.

Referring again to FIG. 9, using the latter serialization approach coupled with a simple modulus with the number of queues, a first function "DEPOSIT (1111, $1000)" (instructing that the account balance in account 1111 be increased by $1000) is sent to structure 39b based on a serialization set identifier of 1111 determined from the account number and mapped to structure 39b (1111 mod 3=1) associated with processor 12b. A succeeding operation "WITHDRAW (2222, $50)" (instructing that the account balance in account 2222 be reduced by $50) is sent to structure 39c (2222 mod 3=2) associated with processor 12c and so forth. The queues 39 collect operations 26 related to common serialization sets ensuring that their operations are executed in sequential program order. In addition, by collecting operations related to common data sets 30 improved memory caching may be obtained.

The queues 39 serve at least three purposes. First, they communicate computational operations 26 and input values to the delegate threads running on additional processors 12. Second, the use of ordered queues ensures that the computational operations 26 are processed by the delegate threads in a consistent order, ensuring the desired sequential program semantics. Third, they allow continuous utilization of the processors 12 and help the system tolerate bursts of computational operations assigned to the same sequential delegate thread. Note that while the exemplary embodiment is described in terms of a simple set of ordered queue, any communication structure that preserves the ordering of operations on a particular data element may be used.

For the sake of simplicity, our example shows the number of queues 39 to be equal to the number of additional processors 12 in the system, and each queue is accessed by a single processor. A larger number of queues 39 than processors 12 may be used to establish a finer granularity of assignment of operations to processors 12. Also, a single structure 39 need not be tied to a single processor 12 for the duration of the program. As long as operations are consumed from a queue by no more than one processor at a time, the probability of data race errors is reduced. This property may be ensured using processor synchronization primitives to establish mutual exclusion on the queues 39 as is understood in the art. Combining multiple queues 39 with dynamic assignment of queues 39 to processors 12 may be used to provide dynamic load balancing of execution of the computational operations by the delegate threads running on these processors. In some embodiments, the queues 39 may be augmented so that delegate threads that finish all work in a particular structure 39 can steal work from other queues in a manner that preserves the ordering of computational operations 26 on data sets 30.

A combination of the properties reduces the likelihood that the operations of delegate threads running on processors 12 create data-race errors. First, operations on a particular data set 30 are mapped to a single serialization set 38. Second, all members of a given serialization set are inserted into a single queue 39. Third, each queue is accessed by at most one delegate thread 34 at a time. Thus, as the delegate threads 34 running on processors 12 execute the operations collected within the queues 39, they may directly access memory 18 for writing and reading values without concern for conflicts.

As we have described, the proposed system and method employs mechanisms to ensure sequential program semantics and reduces the likelihood of data race errors. These mechanisms define precise orderings on all computations performed on related data. As a result, running a correct program employing the present serialization system and method results in deterministic execution; that is, the result of the program depends only on its input, and not on the scheduling of events during an execution of the program. This predictability leads to programs that are significantly easier to develop, debug, and maintain than traditional multi-threaded programs.

Referring now to FIGS. 10 and 5, in a process block 51, all access to data sets 30 by a computational operation 26 may cause a recording in a tag 74, the serialization set identifier 38 of the accessing computational operation 26. Thus, for example in FIG. 5, execution 26.11 of function 26.1 accessing data set 30.1, would record its serialization set identifier in the tag 74 at the time of that access. The previous value of the tag 74 is compared to this current value and if they do not match, an error condition may be raised, because two different serialization sets, assumed to be data independent, are not data independent since they are accessing the same data sets 30. This serialization error may be reported or may be used in a speculative system to take action on a mis-speculated computational operation, e.g., squashing.

Referring again to FIG. 7, the independence of two computational operations 26 is determined principally by a determination that their data sets 30 are disjoint in a step 58. Accordingly, improved parallelism may be obtained by using memory structures, for example container objects or structured variables, that serve to separate data sets 30 to different executions of a computational operation. Thus, for example, a memory structure may be used to provide separated account information in the above example. If the data sets 30 are disjoint, the delegate thread 34 executes the computational operation in a step 60. If not, an error condition is identified in a step 59. A determination is made in a step 61 whether the next operation is another computation proxy, in which case, steps 57-60 are repeated, or a synchronization operation, processed as described below.

Using the present system and method, the default state for these programs is sequential execution, and independent operations 26 are dynamically identified for parallel execution. When an operation 26 on a data set 30 is sent to another processor 12 for execution, this new processor effectively becomes the owner of data set 30, and the program thread 28 must not operate on this data structure to minimize creating data race errors. A mechanism is needed to safely reclaim the ability to modify a given data structure, or to completely resume sequential execution for portions of the program that do not contain independent operations.

Figure 12:
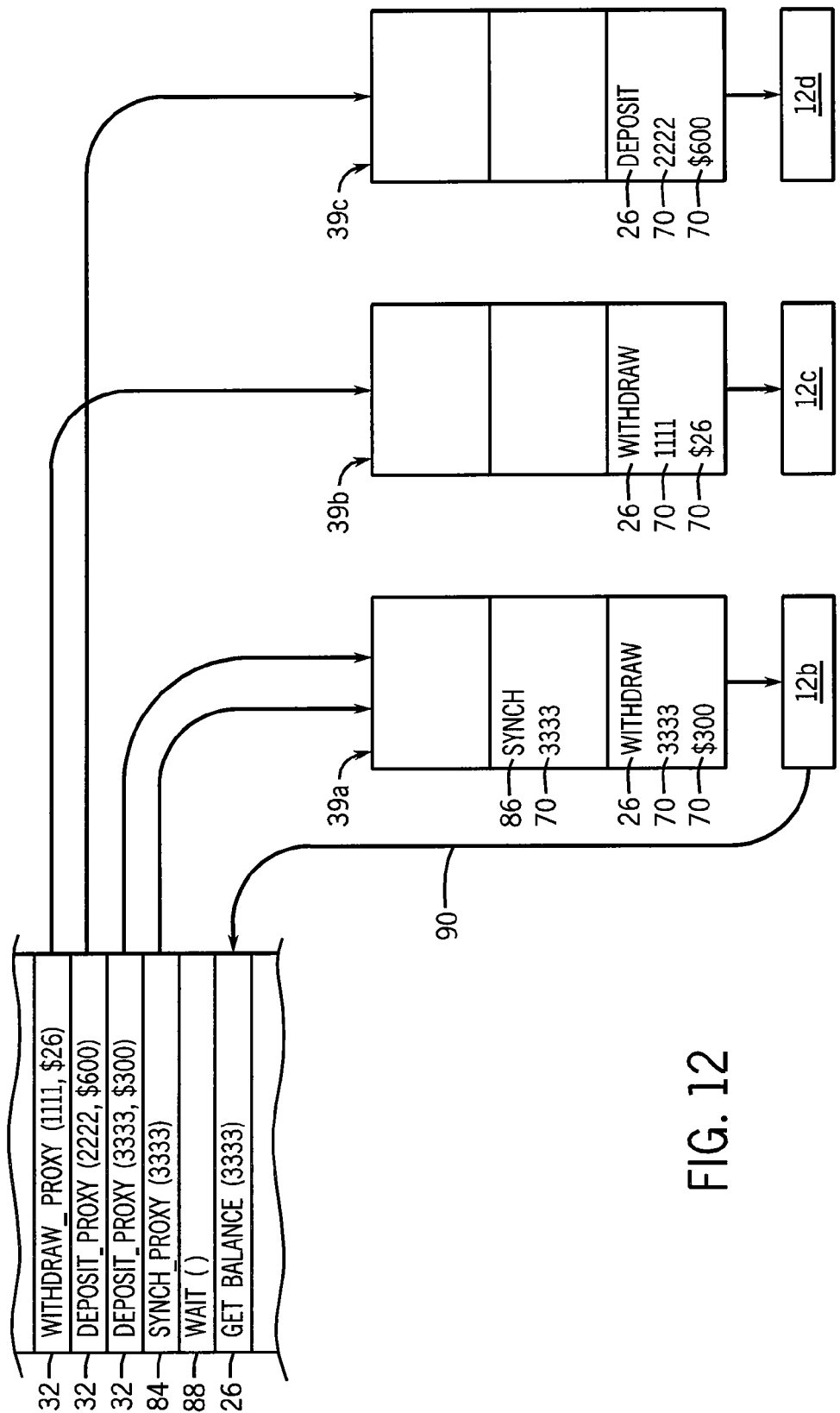
FIG. 12 is a flow diagram similar to that of FIG. 9 showing the use of synchronization functions for synchronizing program and delegate threads.

Referring now to FIGS. 7 and 12, at times it is therefore necessary to synchronize the various computational operations 26 stored in the ordered communication structures 39 and executing on the different processors 12b, 12c, and 12d in a step 62. Synchronization in this context refers to the mechanism for waiting until computational operations 26 associated with a given serialization set identifier 38 for data set 30 have completed execution. This requires ensuring there are no remaining computational operations 26 associated with the particular serialization set 38 in the ordered communication structures 39, or executing in a delegate thread 34 on a processor 12.

There are several possible embodiments of the synchronization operation. The synchronization operation may be performed by the introduction of a synchronization function 86 that is sent by the program thread 28 using a synchronization proxy 84 that transfers the synchronization function 86 to a delegate thread 34 running on a processor 12 via a queue 39 in the same fashion that computation proxies transfer other computational operations. The synchronization function 86 causes the program thread to wait, for example, using a wait function 88 for the queue 39 associated with the serialization set 38 of the data set 30 to empty, ensuring there are no outstanding operations on that data element. The synchronization function 86 then notifies the program thread 28, with a notification message 90 or the like, that it may continue execution, safely accessing the desired data set 30. Note that because the structure 39 may contain other operations, this synchronization method may cause the program thread to wait longer than is strictly necessary.

This synchronization operation may alternatively be implemented by incorporating into each data set 30 a counter that is used to track the number of outstanding computational operations 26. Each time the program thread executes a computation proxy 32, it increments the counter for the corresponding data set 30. Each time the delegate thread completes an operation, it decrements the counter. The program thread, upon reaching the synchronization operation, will then wait until this counter reaches zero, indicating all outstanding operations on the desired data set 30 have completed, before continuing execution. If a single ordered communication structure 39 is used for each delegate thread 34, this embodiment may be advantageous because the program thread 28 waits only as long as it takes for outstanding operations 26 on the desired data set 30 to complete, and does not wait on additional operations 26 on other data sets 30 that happen to be assigned to the same ordered communication structure 39.

For an embodiment which uses a separate ordered communication structure 39 for each serialization set identifier 38, synchronization may be simply performed by associating a flag with the ordered communication structure that indicates the empty state. When the program thread 28 places a computational operation 26 in the ordered communication structure 39, it may set this flag to non-empty. When a delegate thread 34 finishes executing the last computational operation 26 from the ordered communication structure 39, it may set this flag to empty. Since the program thread 28 and a delegate thread 34 may attempt to simultaneously modify this flag, changing the value of this flag may require the use of a lock or nonblocking synchronization, as is understood in the art.

In addition to synchronizing the program thread 28 with a particular serialization set 38, it may also be useful to synchronize the program thread 28 with respect to all outstanding computational operations 26. During phases where program execution is operating in parallel, most data structures that may be modified are operated on in private by the program thread or a single delegate thread, but some other data may be fixed as read-only and safely accessed by both the program thread and all delegate threads. As different phases of the program execute, different partitioning of the program data sets 30 into read-only and privately-modifiable may be required. Thus a mechanism is required to ensure that all outstanding computational operations using a particular partitioning have completed before commencing parallel execution using a different partitioning.

To synchronize the program thread 28 with all delegate threads 34, the program thread 28 may send synchronization functions 86 to all delegate threads, and then wait for a message 90 from each. This indicates that all outstanding computational operations 26 have completed, allowing the program thread 28 to return to sequential execution, or to resume parallel execution using a different partitioning of the data sets 30.

In another embodiment of the synchronization of program thread 28 with all delegate threads 34, an additional counter may be used to track the overall number of outstanding computational operations 26 among all delegate threads. This counter is incremented by the program thread 28 during each computation proxy 32, and decremented by the delegate threads 34 upon completion of each computational operation. When the program thread 28 reaches the synchronization operation, it waits until this counter reaches zero, indicating that all outstanding computational operations 26 have completed.

Referring again to FIG. 7, following synchronization in step 62, a determination is made in a step 63 whether the program is complete. If not, processing of the computation operations continues. If so, the program terminates in a step 64.

Although the exemplary embodiment consists of a single division of computational operations 26 into serialization sets associated with different delegate threads 34, each serialization set may be further divided into more serialization sets. Parallel execution of data divided in such a hierarchical fashion is known as nested parallelism by practitioners of the art, and may be advantageous for certain programs. The use of nested parallelism allows for very natural expression of recursive algorithms, which typically use a "divide-and-conquer" approach that repeatedly subdivides a particular computation on a set of data into multiple, similar computations. The presence of nested parallelism in the computational operations 26 may also be advantageous for scheduling the operations onto threads, as it reveals a range of granularities in the computation. This allows the scheduler to select the granularity of computational operations 26 best suited to the capabilities of the multi-processor system 10, e.g., by using finer granularities to achieve higher degrees of parallel execution, or by using coarser granularities to reduce overheads associated with scheduling.

Figure 13:
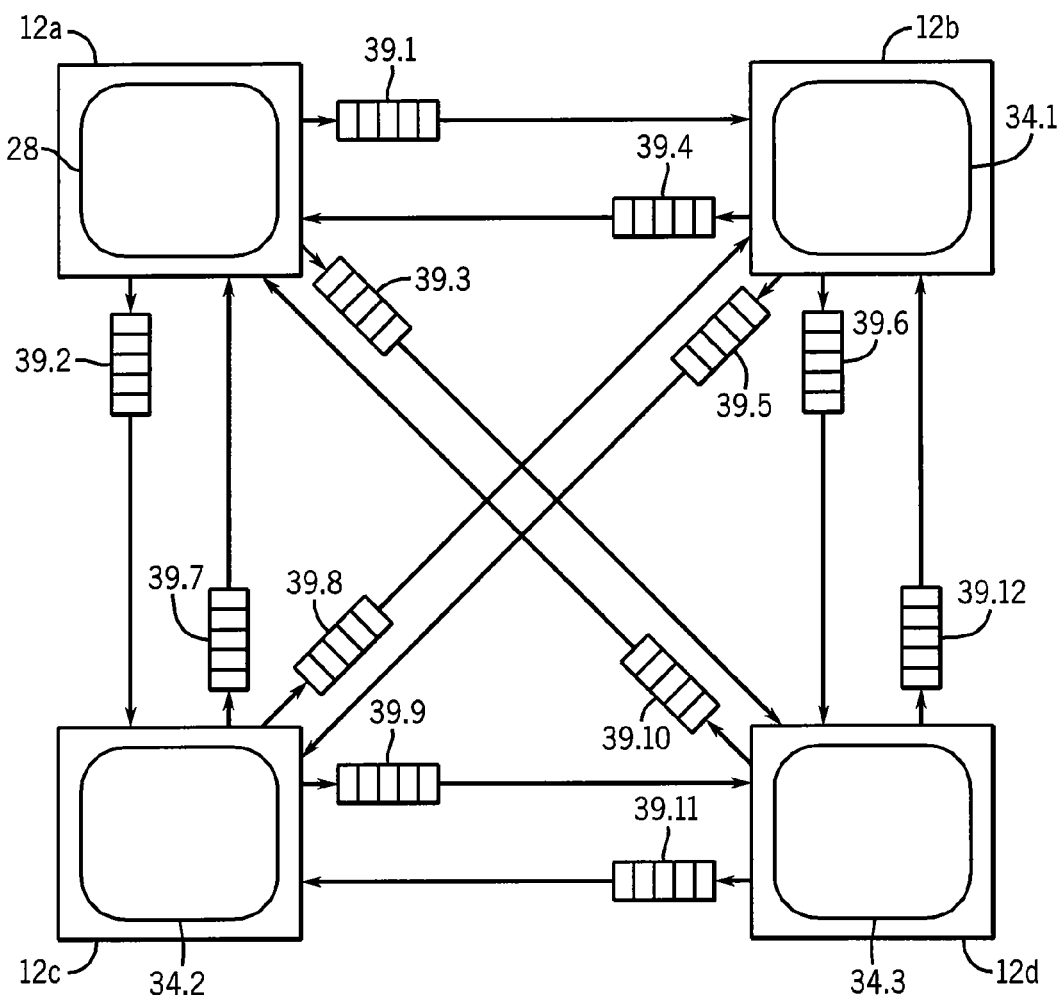
FIG. 13 is a diagram of threads communicating via ordered communication structures implementing a work sharing system capable of combining nested parallelism in accordance with one embodiment of the present invention.

FIG. 13 depicts a simple extension of the exemplary embodiment capable of supporting multiple subdivisions of computational operations 26 into serialization sets 38. In this embodiment, each delegate thread 34 is augmented with multiple, additional ordered communication structures 39 connected to the program thread 28 and each of the other delegate threads 34. Thus in this embodiment, each thread 28, 34 is connected to each other thread 28, 34 via an ingoing and outgoing ordered communication structure 39, and the only distinction between the program thread 28 and the delegate threads 34 is that the program thread 28 is the thread which initially is running the program 20. Each of the threads 28, 34 draws computational operations 26 from the ingoing ordered communication structures 39 to which it is connected in an alternating fashion, and executes them. These computational operations 26 may in turn break into further computational operations each associated with its own serializer. These further computational operations may be spread among a thread's outgoing communication structures 39 according to the serialization set identifiers produced by the serializers to allow parallel execution by the other threads 28, 34. Such an arrangement of threads and communication structures represents a simple implementation of work sharing (also known as work dealing), as is understood in the art.

Such an embodiment may combine the benefits of using serialization sets, i.e., reducing the probability of data races and nondeterministic behavior, with the benefits of using nested parallelism. This is achieved by applying the serialization sets mechanism at each level of the nested parallel computational operations 26—generating a serialization set identifier 38 based on the data sets 30 accessed by the operation; assigning the operation to an ordered communication structure 39 such that computational operations 26 are assigned to no more than one ordered communication structure 39; and ensuring that a synchronization function 86 is used for a particular serialization set identifier 38 whenever a computation of a more shallow nesting level may access data associated with that serialization set and there may still be outstanding computational operations 26 associated with that serialization set identifier 38. The latter requirement may be met by having the synchronization function 86 for a given serialization set 38 synchronize with each further subdivision of the data into serialization sets.

The present application contemplates a library of functions particularly suited for parallelization. These functions may include serializers 36 or templates for functions implementing the serializer. The library may include parallel data structures that include the necessary processor synchronization primitives for safe concurrent execution by the program thread and delegate threads.

The serialization sets of the present application may be used to complement speculative multithreading and hardware transactional memory. These techniques provide support (via hardware, software, or a combination of both) to roll back execution of computations when they violate data dependences. Serialization sets could be used to reduce dependence violations by placing dependent computations in the same speculative thread or transaction. Alternatively, hardware support for speculation or transactions may be used to apply serialization sets in a speculative fashion, by marking computational operations with data they are likely to manipulate, and rolling back the execution when they violate this assumption.

It should be observed that the invention includes, but is not limited to, a novel structural combination of conventional computer processing components and computer hardware and software that may be embodied in a computer-readable medium, and not in particular detailed configurations thereof. Generally, the invention can be implemented flexibly in software, firmware, hardware, and combinations of these as will be appreciated by those of ordinary skill in the art. Further, the invention is not limited to the particular embodiments depicted in the exemplary embodiments, but should be construed in accordance with the language in the claims.

We claim:

1. A method of executing a program on a multi-processor computer with shared memory, the program comprised at least in part of computational operations of program instructions wherein data accessed by at least one computational operation affects data written by at least one other computational operation, the method comprising the steps of:
   identifying in the program a plurality of computational operations accessing sets of data in shared memory;
   assigning serialization set identifiers to multiple given computational operations so that computational operations that do not operate on the same data are assigned different serialization set identifiers; and
   using the assignment of serialization set identifiers to control which processor of the multi-processor system executes which computational operation so that the computational operations with the same assigned serialization set identifier execute on a same processor of the multi-processor computer.

2. The method of claim 1 further including the steps of:
   assigning the computational operations to different ordered communication structures based on the different serialization set identifiers of the computational operations;
   reading for execution, computational operations from the ordered communication structures by different processors of the multi-processor computer such that a single ordered communication structures is read by only a single processor at a given time.

3. The method of claim 1 further including the steps of:
   identifying within the program at least one synchronization point with respect to at least one given set of data;
   detecting execution of the program to the synchronization point;
   upon the detection, controlling the assignment of computational operations to the different processors such that all assigned and uncompleted computational operations writing the at least one given set of data are completed by the synchronization point before further execution of the program past the synchronization point.

4. The method of claim 3, including the step of embedding within the program at the synchronization point a synchronization operation causing further assigning of computational operations to different processors to cease until a processor receiving the synchronization operation reports completion of the synchronization operation.

5. The method of claim 4 wherein a synchronization operation is associated with a serialization set identifier and assigned to a processor of the multi-processor computer based on the serialization set identifier.

6. The method of claim 1 further including the steps of:
   monitoring access of the shared memory by different processors executing the computational operations; and
   detecting conflicting access of a given set of data when the given set of data is accessed by processors associated with different serialization set identifiers.

7. The method of claim 6, wherein the monitoring marks memory blocks accessed by a computational operation with the serialization set identifier for the computational operation and the detecting detects when a serialization set identifier associated with a pending write to the memory block differs from the marked serialization set identifier of the memory block.

8. The method of claim 1, wherein the sets of data are stored at addresses in memory and wherein the serialization set identifier is a mapping of an address of the set of data accessed by the computational operation to a serialization set identifier.

9. The method of claim 1, wherein the sets of data are identified by an instance number and wherein the serialization set identifier is a mapping of an instance number for a set of data accessed by the computational operation to a serialization set identifier.

10. The method of claim 1, wherein the set of data accessed by computational operations may be computed from variables in a run-time environment of the program and wherein the serialization set identifier is a mapping of variables in the run-time environment to serialization set identifiers.

11. The method of claim 1, wherein the computational operations are implemented using computation proxies replacing the computational operations in the program.

12. The method of claim 11, wherein the computation proxies include instructions for deriving the serialization set identifier for the replaced computational operation.

13. The method of claim 1 wherein computational operations for a serialization set identifier associated with a given processor are not simultaneously associated with any other processor.

14. The method of claim 1 wherein the computational operation is selected from the group consisting of: program functions and program object methods.

15. A multi-processor computer comprising:
   multiple processors;
   a shared memory communicating with the multiple processors and holding a program providing computational operations of program instructions wherein the data accessed by at least one computational operation affects the data written by at least one other computational operation;
   a serializer configured to identify a serialization set identifier for a given computational operation based on the set of data to be accessed by the given computational operation so that computational operations that do not operate on the same data are assigned different serialization set identifiers; and
   an assigner receiving the identification of a given computational operation and the given identified serialization set identifier for the given computational operation and using the given serialization set identifier to assign the given computational operation to a processor so that computational operations having the same serialization set identifier are assigned for execution to a same processor.

16. The multi-processor computer of claim 15 wherein the serializer is a set of instructions inserted into the program and is associated with a computational operation.

17. The multi-processor computer of claim 15 wherein the assigner includes at least one ordered communication structure configured to receive computational operations from a first processor so that the computational operations may be drawn from the ordered communication structure by one or more second processors associated with the serialization set identifier of the computational operation.

18. The multi-processor computer of claim 15, further including a memory monitor recording a serialization set identifier of a current computational operation accessing a memory block, and further including an error detector indicating an error when a previous serialization set identifier recorded for a memory block differs from the current serialization set identifier.

19. A parallelizing program fixed in a computer readable medium and executable on an electronic computer in conjunction with an application program, the application program having a plurality of computational operations accessing sets of data in shared memory during execution of the computational operations, where different computational operations may write to the same data elements during execution of the program, the parallelizing program executing on the electronic computer to:
   demarcate in the application program a plurality of computational operations accessing sets of data during execution of a computational operation;
   generate a serialization set identifier for each execution of a computational operation so that computational operations that do not operate on the same data are assigned different serialization set identifiers; and
   using the assignment of serialization set identifiers to control which processor of the multi-processor system executes which computational operation so that computational operations having the same serialization set identifier are assigned for execution to a same processor.

20. The program of claim 19 wherein the parallelizing program executes during at least one of compilation, interpretation and execution of the application program.

21. A method of executing a program on a multi-processor computer with shared memory comprising the steps of:
   identifying in the program a plurality of computational operations accessing sets of data in shared memory;
   designating within the program at least one synchronization point with respect to at least one given set of data;
   assigning serialization set identifiers to multiple given computational operations so that computational operations that do not operate on the same data are assigned different serialization set identifiers; and
   detecting execution of the program to the synchronization point;
   using the assignment of serialization set identifiers to control which processor of the multi-processor system executes which computational operation so that the computational operations with the same assigned serialization set identifier execute on a same processor of of the multi-processor computer for execution such that all assigned and uncompleted computational operations writing the at least one given set of data are completed by the synchronization point before further execution of the program past the synchronization point.

22. The method of claim 21, including the step of embedding within the program at the synchronization point a synchronization operation causing further assigning of computational operations to different processors to cease until a processor receiving the synchronization operation reports completion of the synchronization operation.

23. The method of claim 22 wherein a synchronization operation is associated with a serialization set identifier and assigned to a processor of the multi-processor computer based on the serialization set identifier.

24. A method of executing a computer program in parallel on different processors, the program when executed on a single processor following a serial execution order in an accessing of variables by computational operations of the program, the method comprising the steps of:
   (1) linking computational operations within the program to serializer routines executing before the computational operations in the serial execution order; wherein the serializer routines map computational operations among different serialization sets during execution of the program, so that computational operations that do not operate on the same data are mapped to different serialization set identifiers;
   (2) enrolling two computational operations to a same ordered communication structure when the serializer routines for the two computational operations map to the same serialization set, the enrolling writing data to the ordered communication structure scheduling the enrolled computational operation for execution; and
   (3) executing the computational operations in a given ordered communication structure according to their order of enrollment.

25. The method of claim 24 wherein multiple computational operations co-existing within an ordered communication structure are executed by a same processor.

26. The method of claim 24 wherein the computational operations are object methods and the serialization sets are based on instantiation numbers of objects of the object methods.

27. The method of claim 24, wherein the data are stored at addresses in memory and wherein the serialization sets are based on at least one address of the data.

28. The method of claim 24, wherein the data accessed by computational operations may be determined in a run-time environment of the program and wherein the serialization sets are based on variables as determined in the run-time environment.

* * * * *

UNITED STATES PATENT AND TRADEMARK OFFICE
CERTIFICATE OF CORRECTION

| | | |
|---|---|---|
| PATENT NO. | : 8,417,919 B2 | Page 1 of 1 |
| APPLICATION NO. | : 12/543354 | |
| DATED | : April 9, 2013 | |
| INVENTOR(S) | : Matthew Allen et al. | |

It is certified that error appears in the above-identified patent and that said Letters Patent is hereby corrected as shown below:

IN THE CLAIMS

Column 20, line 16, please amend the paragraph as follows:

-- using the assignment of serialization set identifiers to control which processor of the multi-processor system executes which computational operation so that the computational operations with the same assigned serialization set identifier execute on a same processor ~~of of~~ of the multi-processor computer for execution such that all assigned and uncompleted computational operations writing the at least one given set of data are completed by the synchronization point before further execution of the program past the synchronization point. --

Signed and Sealed this
Twenty-second Day of April, 2014

Michelle K. Lee
*Deputy Director of the United States Patent and Trademark Office*